Figure 1:
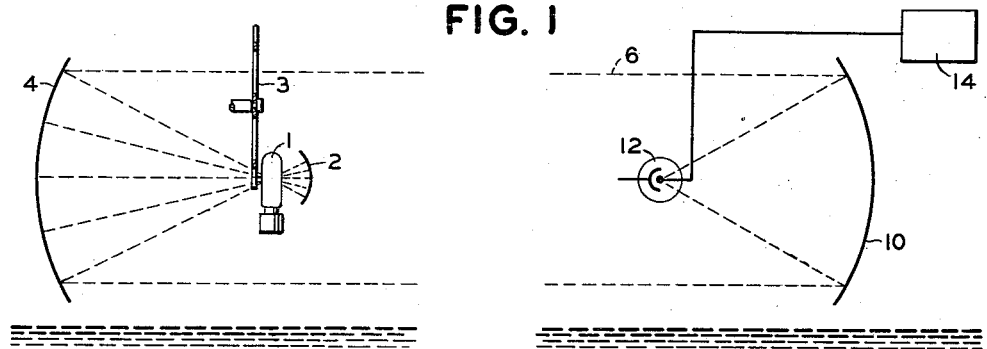

May 26, 1942.    M. H. A. LINDSAY    2,284,289
PHOTO-ELECTRIC SIGNALING SYSTEM
Filed Sept. 30, 1938

INVENTOR
M. H. A. LINDSAY
BY
ATTORNEY

Patented May 26, 1942

2,284,289

UNITED STATES PATENT OFFICE 2,284,289

PHOTOELECTRIC SIGNALING SYSTEM

Maxwell H. A. Lindsay, Summit, N. J., assignor to The American District Telegraph Company, New York, N. Y., a corporation of New Jersey Application September 30, 1938, Serial No. 232,551

9 Claims. (Cl. 177—311)

This invention relates generally to light-sensitive detection circuits and apparatus, and more particularly to an arrangement involving a light beam adapted for use in outdoor applications and particularly to locations such as waterfronts and the like. In all outdoor applications of photo-electric devices for detecting the interception of a beam of light, it is found to be difficult to overcome the effects of ambient light changes and light changes due to reflections from various objects such as glass windows, waves on the surface of a body of water, and other light reflecting bodies.

Under the circumstances where a photo-electric alarm system is required to cover considerable distance or operate through adverse weather conditions, consisting of heavy smoke, fog, etc., considerably more sensitivity is required than is found in ordinary forms of circuits in order to insure reliable operation. This sensitivity may be secured through the use of powerful light sources of either visible or invisible light and also by greatly increasing the sensitivity of the receiving system.

In order to gain sensitivity in the receiver, it is necessary that the transmitted light be modulated or of cyclically varying intensity in order that its effect upon the photo-electric cell may be aplified through associated amplifying equipment. Such periodic variation of the transmitted light also renders the light-detecting system more difficult to defeat and more selective in that the receiver may be tuned to the modulation frequency thereby excluding all light variations except the modulated light from the desired source. The sensitivity of the receiving system however is varied in accordance with the light received from the source; i. e., for maximum sensitivity when the beam is reduced in intensity by fog, for example, and vice versa, whereby the receiving system will always respond to a predetermined percentage variation in modulated light from the source. Compensation under varying conditions of the receiving equipment is an important feature of the invention since the protective light beam or light barrier may be completely intercepted by the hull of a boat, for instance, and yet if the amplifier gain is still high enough there may be sufficient light from the source reflected by the metal work and glass of the boat to prevent the receiver from operating to sound an alarm.

The principal object of this invention is to provide a light-sensitive protection system wherein the effects of ambient light, reflected light, or any varying light will not affect the system in such a manner as to prevent an alarm.

Another object of this invention is to provide a photoelectric detecting system which cannot be defeated by the use of flashing light sources by intruders.

A further object of this invention is to provide a light-sensitive detection system wherein the sensitivity of the receiving equipment is regulated in accordance with ambient light conditions to prevent defeat of the entire system, permit the use of a much longer light beam than has been possible heretofore, and obtain other operating advantages.

Still another object of this invention is to provide a photo-electric alarm system wherein the light barrier is modulated at a certain frequency and the receiving equipment is responsive to only that certain frequency to thereby prevent defeat of the system by flashing light sources.

A still further object of this invention is to provide a photo-electric alarm system wherein the sensitivity of the receiving equipment is maintained at such a level that the interception of a comparatively small portion of the light barrier causes an alarm.

Still another object of this invention is to provide a photo-electric alarm system wherein the light barrier is modulated at a certain frequency and the receiving amplifier is tuned to that particular frequency so that light variations of no other frequency can actuate the receiving equipment to prevent an alarm condition.

Figure 2:
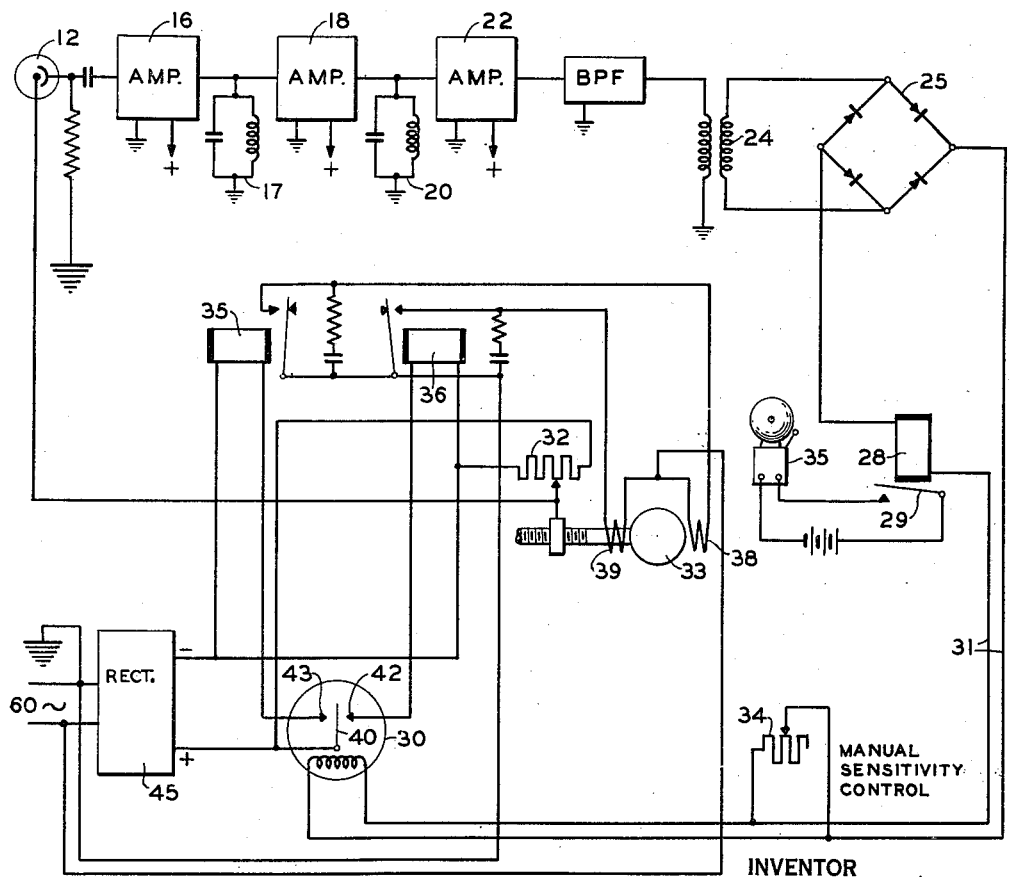

Further objects and advantages of this invention will be evident from consideration of the following description of the system shown in the accompanying drawing, wherein:

Fig. 1 shows a diagram of the transmission and receiving equipment in relation to an over-the-water application, and Fig. 2 shows a circuit diagram of the light sensitive receiving equipment.

The invention will be described in connection with a waterfront application since it is found that such locations present the greatest difficulties when it is desired to use photo-electric equipment. Fig. 1 of the drawing shows diagrammatically a transmitting light source 1, a spherical reflector 2, and a light modulating or chopping device 3. Light from the source 1 is interrupted by the device 3, which may be a rotating spoked wheel having a number of light intercepting blades on the periphery thereof and rotating at a speed of 1800 R. P. M. Assuming that there are eleven blades and eleven openings, the light beam is modulated at a frequency of 330 cycles per second. It will be apparent that other frequencies may be utilized, if desired. After modulation, the light beam is reflected from a parabolic reflector 4 which creates an intangible light beam or light barrier 6, the light barrier extending across whatever area it may be desired to protect and comprising either visible or invisible radiation.

The receiving equipment may be located at the other end of the intangible beam so that any interception by an intruder will cause an alarm to be given. As shown, this equipment comprises a parabolic reflector 10 which collects the light transmitted from the light source 1 and concentrates it upon a light-sensitive cell 12. The light sensitive cell 12 is connected to amplifying equipment 14, shown in Fig. 2, which amplifies the output to maintain an alarm relay and the alarm signal inoperative. Thus interception of the light beam or barrier will cause an alarm to be given.

It is found in practice that ordinary amplifying equipment will not operate satisfactorily in systems of this character since changes in ambient light will cause false alarms or under certain circumstances prevent the desired response of the alarm device, and intruders can defeat the system by the use of varying light sources. Thus if a sensitive amplifier is employed, normal variations of the light beam owing to the presence of smoke or fog cause a false alarm to be received or, if the beam is intercepted, reflection of a part of the beam may be sufficient to prevent the operation of the alarm. In order to meet these difficulties, the compensated amplifier shown in Fig. 2 is provided for the purpose of selectively amplifying the output of the photo-electric cell 12. The output of the light-sensitive cell is amplified in the first stage of amplifier 16 after which an anti-resonant filtering circuit 17 attenuates all frequencies except the 330 cycle wave generated by the photo-electric cell in response to the light barrier. A second amplifier stage 18 amplifies the 330 cycle wave after which another anti-resonant filter 20 attenuates any non-signal frequencies which may not have been attenuated by the previous filter. The signal wave is further amplified by another stage of amplification 22 after which a band pass filter B. P. F. passes only the 330 cycle wave. The output of the entire amplifier is passed through a transformer 24 and rectified in rectifier 25, after which the current flows through an alarm relay 28 and the galvanometer relay 30. Thus failure of the light barrier due to interception by an intruder will cause a decrease of direct current in relay 28 thereby allowing the contacts 29 of alarm relay 28 to close and sound an alarm 35. A bell is shown as the alarm but an annunciator, a lamp, a buzzer or any other alarm means may be used.

As described above, the amplifying circuit will select only the 330 cycle current generated in the photo-electric cell 12 but further selection is desirable in order to prevent intruders from defeating the system and in order to prevent reflected light or other ambient light changes from causing false operation of the circuit.

It is found in practice that the light barrier must not only have a characteristic frequency but the amplifier must be adjusted to such a level that the interception of a comparatively small portion of the light barrier will affect the output of the amplifier, thereby making it selective in this respect. It is possible to adjust the volume of the amplifier circuit to such a point that the signal output of the first amplifier stage will be very small during periods of intense ambient light conditions but in the succeeding stages of the amplifier the small value of signal current would be amplified to such an appreciable extent that no alarms would result from beam interception. Furthermore, the change in the quantity of light affecting the cell 12, due to the passing of a boat, for example, through the light barrier, could be so small that the decrease in the amplifier output would be immaterial and would not result in an alarm. This is due to the high amplification factor and to the fact that glass and other surfaces of a boat will reflect the light barrier and sunlight to such an extent that the effect on the cell 12 is very slight. It is also true that when the amplifier circuit is adjusted for the proper amplification of signals during a very clear day, the photo-electric cell would not respond to changes in the light barrier during a very foggy or snowy condition of the weather. Therefore it is found that the amplification factor of the receiving equipment should be controlled by automatically regulating the voltage on the photo-electric cell 12, in accordance with ambient light changes, to such a value that an alarm will occur upon any predetermined percentage interception of the light barrier. A potentiometer 32 is connected across the power source 45 and provides the anode voltage for cell 12. A reversible motor 33 is mechanically connected to the potentiometer 32 for varying the same. The galvanometer relay 30 controls two switching relays 35 and 36, the contacts of which are connected to the windings 38 and 39 respectively of the reversible motor 33. Since the winding of the galvanometer relay 30 is connected in the output of the amplifier circuit by conductors 31, it will follow increases and decreases in the amplifier output current thereby moving its armature 40 to either contact 42 or contact 43.

As mentioned above, the galvanometer relay 30 is connected in series with the alarm relay 28 and the output transformer 24 of the receiving amplifier. In addition, a shunting resistor 34 is connected across the galvanometer relay 30 for the purpose of manually controlling the operating level at which the galvanometer is to operate. The output of the amplifier may then be set for any desired value with respect to the operating values of the alarm relay and will drop to 0 when the protective light beam is intercepted by an unauthorized intruder. Alarm relay 28 should operate when the amplifier output becomes 10 milliamperes or less and when the protective light beam or barrier is sixty to seventy per cent intercepted. Therefore, resistor 34 may be so adjusted that armature 40 is in its central position and the normal output current is approximately 30 milliamperes. Thus sixty to seventy per cent interruption of the protective light beam reduces the output current to 10 milliamperes or less and relay 28 drops to energize the alarm. Adjustment of resistor 34 determines the operating output current and hence the percentage interception of the protective beam which is necessary to operate the alarm. It is also evident that a slight decrease in the receiver output upon the occurrence of a fog or other change in the ambient light conditions will cause the armature 40 to make contact with one of the contacts 42, 43 to thereby operate the relays 35 or 36 and the motor 33. Closure of one contact due to a normal increase in ambient light and an increase in the output of the amplifier when a fog is lifting, for instance, will cause the motor 33 to vary the potentiometer 32 and thereby reduce the sensitivity of the photo-electric cell 12 so that gradual increases in the quantity of ambient light will have no effect on the sensitivity of the receiving apparatus. Conversely, normal decreases in ambient light, when a fog is setting in will decrease the output of the amplifying circuit, reverse the motor 33 and also vary the potentiometer 32 to increase the sensitivity of photo-electric cell 12. Potentiometer 32 is therefore adjusted automatically to such a value that the photo-electric cell 12 and the amplifier is always just sensitive enough to detect the light from the source 1 and maintain the output current to the preset value. Consequently any desired percentage interception of the intangible light barrier 6 will cause the photo-electric cell 12 to stop emitting electrons and thereby cause the alarm relay 28 to release and energize the alarm. The speed of response of the regulating element of the system is such that the above described compensation is slow enough to prevent any possibility of intruders or boats and the like from sneaking through the intangible light beams.

From the above description it is evident that this alarm system overcomes the difficulties presented by ambient light changes and also the possibility of defeating the system by means of flashing or varying light sources. The amplifier circuit can only respond to the light from the associated light source and the receiving apparatus is so regulated that under all conditions it is barely sensitive enough to detect the light emitted from source 1. Therefore, the system is extremely stable, sensitive and selective so that no attempts to defeat the system can be successful while, on the other hand, the possibility of receiving a false alarm is overcome.

Further modifications of this invention will be evident to those skilled in the art and are within the scope of the invention as defined in the appended claims.

I claim:

1. In a light barrier system, a light source for creating an intangible light barrier, said barrier being subject to variation by the atmosphere, a photo-electric cell responsive to said barrier, said cell being exposed to ambient light, a light chopper between said light source and said cell for chopping said light barrier at a certain frequency, an amplifier comprising a plurality of stages of amplification connected to the output of said photo-electric cell, tuned circuits offering high impedance to the chopping frequency of said barrier and low impedance to all other frequencies and connected between stages in said amplifier for limiting the response of said amplifier to the chopping frequency of said barrier, a rectifier for rectifying the entire output of said amplifier and an alarm relay connected to said rectifier and responsive only to interception of said light barrier.

2. In combination, means for generating a light barrier, said barrier being subject to variation by the atmosphere, means for chopping said light barrier at a certain frequency, a light-sensitive cell responsive to said light barrier for converting said light energy to electrical energy, said cell being exposed to ambient light, means for selectively amplifying energy of said certain frequency only whereby tampering or false signals are prevented, means for rectifying said selectively amplified energy and alarm means controlled by said electrical energy.

3. In combination, means for generating a light barrier, said light barrier being subject to variation by the atmosphere, light-sensitive means exposed to the effects of ambient light and responsive to said light barrier for converting energy therefrom into electrical energy, a resistance in the anode circuit of said light-sensitive means for controlling the sensitivity of said light-sensitive means, means for amplifying said electrical energy, alarm means operated by said electrical energy when said barrier is rapidly interrupted to a certain degree, mechanical means for varying said resistance and sensitivity of said light-sensitive means, switching means connected in series with said alarm means and responsive to increases and decreases in the output of said amplifier and means connected to said switching means for actuating said mechanical means and thereby varying said resistance and the sensitivity of said light-sensitive means in response to changes in the output of said amplifying means resulting from atmospheric changes and the effects of ambient light to maintain the output of said light-sensitive means substantially constant.

4. In a light barrier system, a light source for creating a light barrier, said barrier being subject to variation by the atmosphere, a light-sensitive cell responsive to said light barrier and to ambient light for generating a potential, means for amplifying said potential, means responsive to said amplifying means for automatically maintaining the output of said light-sensitive cell at a predetermined level regardless of atmospheric or ambient light changes and signal means in the output of the amplifying means for initiating an alarm in response to rapid changes of light in said light barrier.

5. In a light barrier system, a light source for creating a light barrier, said barrier being subject to variation by the atmosphere, a light-sensitive cell responsive thereto and to ambient light for generating a current, means for amplifying said current, alarm means controlled by said amplifying means and operated when the barrier is rapidly interrupted to a certain degree and retarded means responsive to said amplifying means for automatically maintaining the output of said light-sensitive cell at a predetermined level upon the occurrence of atmospheric changes or gradual variations in ambient light radiation on the cell.

6. In a photo-electric circuit, a light-sensitive cell subject to gradual changes in received light, an amplifier for amplifying the output of said cell, a rectifier for rectifying said amplifier output, an alarm responsive to a predetermined value in said rectifier output resulting from rapid changes in the received light, a resistance in the anode circuit of said light-sensitive cell, a galvanometer relay in the rectifier output and a reversible motor for varying said resistance and the sensitivity of said light-sensitive cell, an electro-magnetic switch actuated by said galvanometer relay when the output of said rectifier increases for operating said motor to decrease said resistance and another electro-magnetic switch actuated by said galvanometer relay when the output of said rectifier decreases for increasing said resistance whereby the sensitivity of the cell varies inversely as the received light varies.

7. In a light barrier system, a light source for creating a light barrier, said barrier being subject to variation by the atmosphere, and receiving means for receiving light from the light barrier and ambient light, said receiving means comprising light-responsive means and means for automatically maintaining the sensitivity thereof barely sufficient to respond to the light barrier whereby the effects of the atmosphere and the ambient light are eliminated.

8. In a light barrier system, a light source for creating a light barrier, said barrier being subject to variation by the atmosphere, a light-sensitive cell for detecting the light barrier, said cell being exposed to changes of ambient light, an amplifier connected to said cell to amplify the output thereof, signal means responsive to a certain level of output in said amplifier, means in circuit with said cell for controlling the sensitivity thereof and means responsive to gradual changes in the amplifier output resulting from gradual changes of light received by said cell for operating said last-mentioned means to maintain said amplifier output above said level except during rapid changes of the light barrier.

9. In a signaling system, a light source for creating a protective light beam, said beam being subject to variation by the atmosphere, a light-sensitive cell responsive to said light beam and to ambient light for generating a potential, means for amplifying said potential, signal means in the output of said amplifier and responsive to a predetermined value of output of said amplifier when rapid changes of light occur in said light beam, and means for eliminating the effects of variations in said light beam by the atmosphere and the effects of ambient light on said cell comprising means controlled by gradual changes in said amplifier output for automatically maintaining the output of said cell at a certain level whereby said predetermined value only occurs as a result of a certain degree of interruption of said light beam.

MAXWELL H. A. LINDSAY.